July 30, 1940.  A. E. HANSEN  2,209,600
HOOK
Filed Dec. 4, 1939
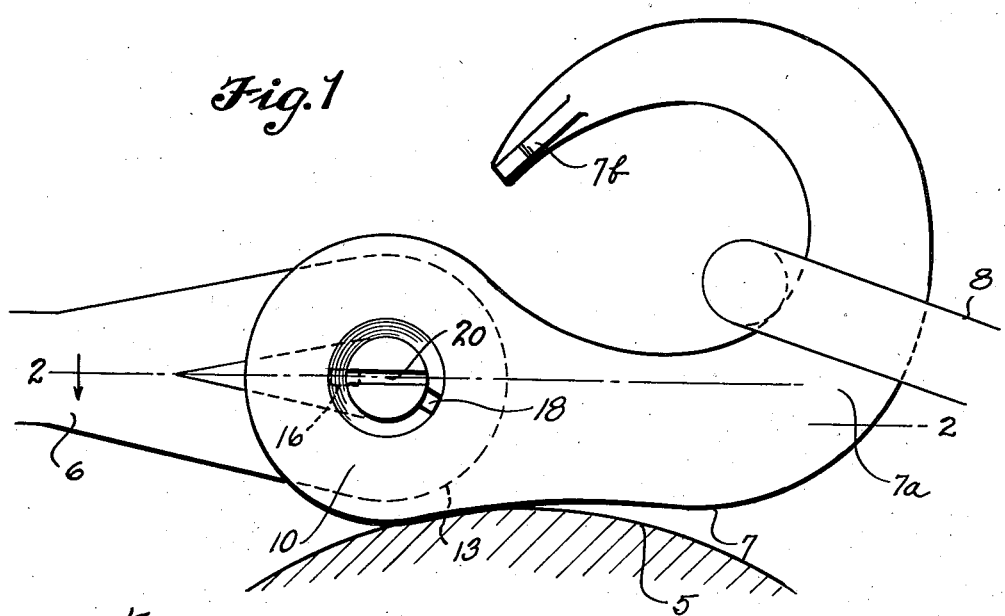
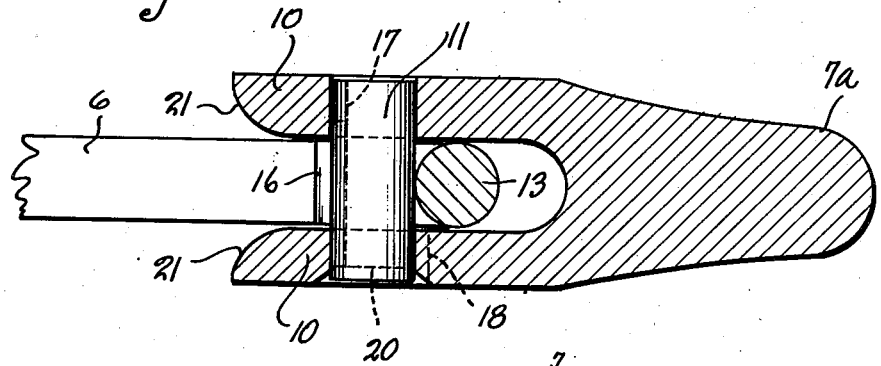
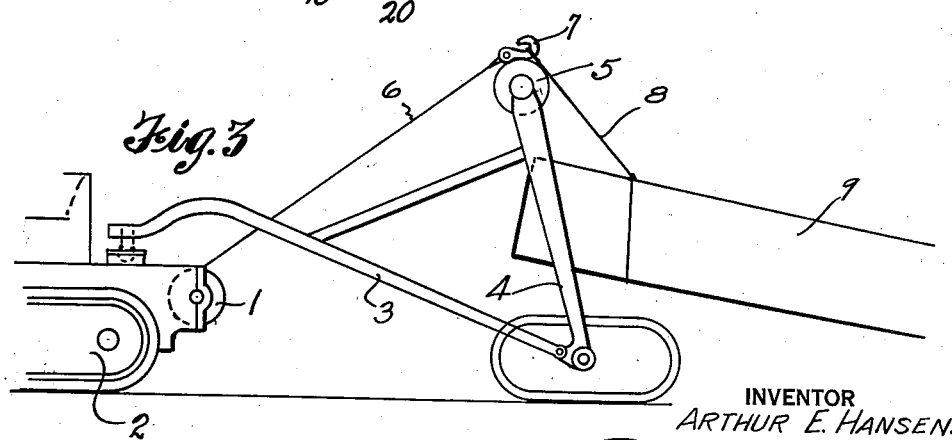
INVENTOR
ARTHUR E. HANSEN.
BY
Cook & Robinson  ATTORNEY Patented July 30, 1940

2,209,600

UNITED STATES PATENT OFFICE 2,209,600

HOOK

Arthur E. Hansen, Seattle, Wash., assignor to Young Iron Works, Seattle, Wash., a corporation of Washington Application December 4, 1939, Serial No. 307,452

3 Claims. (Cl. 294—78)

This invention relates to improvements in hooks and cable connections therewith, and it has reference more particularly to improvements in hooks of those kinds generally known as "tractor hooks," and designed for use in logging operations at the ends of cables that are caused to travel over or contact with a drum of fair-lead roll; it being the principal object of this invention to provide certain improvements in the details of construction of such hooks whereby the eye splice of the cable to which the hook is attached will be protected against wear and damage that would cause breakage.

Explanatory to the present invention, it will be stated here, as an example, that in present-day logging, it is quite common to use a tractor for drawing what is known as a "high arch;" this being a vehicle including a transverse arch equipped at the top with fair-lead rolls by which a cable is guided from a winding drum or winch on the tractor to the logs for drawing them in and for suspending them in the arch while the latter is towed by the tractor; such a system of logging being described and illustrated in United States Patent No. 1,807,325, issued May 26, 1931, to H. H. Richmond, and also in others of prior art.

To better explain the reason for the present improvement, attention will be called to the fact that in logging operations, such as those described in the above patent, wire cables of the multiple strand type are invariably used and the hook provided at the end of the main cable, or those hooks which may be applied to the ends of the section cables from which lines extend to the logs, are frequently caused to pass over or to rest upon the fair-lead roll of the arch, and in use of the usual types of hooks, the strands of the cables are unprotected and in passing over the roller, are caused to be kinked, mashed, or broken due to the great weight of the logs handled, or otherwise damaged to such extent that the eye splice of the cable whereby the hook is secured thereto, will be weakened and ultimately will break. This is a very frequent occurrence, and results in quite an expense both from the standpoint of repair and loss of time, outside of possible damage to equipment or to persons operating the system.

In view of the above, it is the principal object of this invention to so construct a tractor hook of the character referred to that the eye splice of the cable to which the hook is attached, is protected from coming into direct contact with the drum or roll surface and is thereby insured against wear, or strain, that is usually incident to its being permitted to be drawn into contact or to come to rest in contact with any hard metal surface.

More specifically stated, the invention resides in the provision of a hook having spaced flanges at its attaching end between which the eye splice of the attached cable is located and protected from direct bearing contact with guides, rolls and the like.

Other objects of the invention reside in the combination of parts and their use whereby the life of the cable will be greatly extended and damage to equipment and to persons reduced to a minimum.

In accomplishing these and other objects of the invention, I have provided the improved details of construction, the preferred forms of which are illustrated in the accompanying drawing, wherein—

Fig. 1 is a side view of a tractor hook embodying improvements in accordance with the present invention, and showing the eye splice of the cable to which the hook is attached.

Fig. 2 is a cross section on line 2—2 in Fig. 1, particularly illustrating the cable attaching pin and relationship of the hook flanges.

Fig. 3 is a view showing the parts involved in the present combination, and illustrating the use of the present hook, and the manner in which the eye splice is protected by the hook flanges.

Referring more in detail to the drawing—

In Fig. 3, I have illustrated, rather diagrammatically, the use of the parts involved in the present combination.

In this view, 1 designates what may be the cable winding drum of a logging tractor 2, connected by a tongue 3 for towing a logging arch, designated at 4. The arch is equipped at the top or crest with a fair-lead roll 5 over which a cable 6, that is extended from the drum 1, is adapted to travel, and to the end of which cable, a hook 7, embodying improvements in accordance with the present invention, is attached. Applied to the hook 7 is a cable 8 by which a log 9 is adapted to be held suspended from the arch while the latter is towed by the tractor.

The present hook comprises shank portion 7a of heavy and substantial design, formed at one end with what is referred to as an arrow point 7b, and at the other end terminating in spaced flanges, or wings 10—10, coaxially aligned, and between which a pin 11 is extended for the attachment of the hook to the cable 6.

By reference more particularly to Fig. 1, it is to be observed that the cable 6 is formed at the end with the usual eye 13 through which the hook attaching pin 11 extends, and that the flanges 10—10 are spaced sufficiently to receive the eye between them without binding. However, the main feature of this arrangement resides in the fact that the flanges 10—10 are of such diameter or width that they extend slightly beyond the outer surface of the cable eye and thus prevent the strands of the eye from contacting any surface across which the hook may be drawn. This will be best understood by reference to Fig. 1, wherein the hook is shown as being in direct bearing contact with the surface of the fair-lead roll 5, while the eye and strands thereof are held in the clear of the roll and are thus not subjected to wear or any damaging forces as otherwise would be the case when the flanges were not present or are only of such extent that the outer surfaces of the cable eye would lie outside of their limits.

The pivot or attaching pin 11, as observed in Fig. 2, is revolubly fitted in holes 15, centrally of the flanges, and is held in place by means of a key 16 that is seated in a slot 17 in the pin. The end surfaces of the key are adapted to engage with the inner surface of the flanges 10—10 and the relationship of the key to the splice eye is such that it will act to hold the pin against rotation relative to the eye and also out of alignment with a key slot 18 that is provided through one of the flanges 10 for seating the pin.

Should it be desired to eliminate use of the key 16, then the pin 11 could be threaded for threaded application into one of the holes 15 of the flanges 10 and would be equipped at the other end with a wrench head, or slot, as at 20, to facilitate the threading of the pin into place.

It is to be understood that the flanges 10—10 might lie in planes parallel to the plane of the hook, or that the hook shank might be turned to lie in a plane parallel with the axis of the pin; this being optional. However, the hook as here illustrated, is believed to be more practical from all standpoints.

Another feature of construction of the hook is shown in Fig. 2, wherein it is noted that the inside corner surfaces of the flanges 10—10 have been outwardly rounded as indicated at 21, in order to reduce or to prevent wear on the cable.

This is desirable in view of the fact that the hook may not, at all times, assume the upright position shown in Fig. 3, when drawn across the fair-lead roll, but may lie flatly against the roller, and in such case, the cable would be drawn tightly against an edge or inside corner surface of one of the flanges 10. The rounding of the corner eliminates any damage due to the great strain applied.

Hooks of this character may be made in different sizes in accordance with the use to which they are to be put, and they might be used with cables of different size. However, the main feature of the invention resides in the provision of the spaced flanges 10—10 for containing the eye splice of the cable between them, and in the fact that these flanges are of such diameter, or extent, that they will extend beyond and protect the wire strands of the eye splice from damage that would be incident to the eye being drawn tightly against any hard or sharp surface such as that of the fair-lead rollers, or flanges of winding drums, or the like, across which the hook is frequently caused to pass.

Furthermore, it is not intended that the hook be limited in use to logging operations, and the present illustration in Fig. 3 is only for the purpose of better explaining the use of the hook and the purpose for which the flanges 10—10 are provided. It is contemplated that such hooks might be put to good use in mining, dredging or similar operations, and when so used, are quite frequently subjected to the same abuses as when used in logging operations.

Having thus described my invention, what I claim as new therein, and desire to secure by Letters Patent is—

1. In combination, a hook of the character described having its shank terminating at the attaching end in spaced flanges, a cable looped to form an eye at its end disposed between and confined within the peripheral limits of said flanges, and a pin extended through the flanges and through the cable eye, to attach the hook to the cable.

2. A combination as recited in claim 1 wherein the flanges at the shank end are of circular outline and in coaxial relationship, and have holes for said pin centrally thereof and said pin is revolubly mounted therein.

3. In a hook of the character described, a shank terminating in spaced flanges and a pin extended between the flanges, a cable formed at the end with an eye through which the pin extends; said flanges having the inside peripheral edges rounded off.

ARTHUR E. HANSEN.